March 15, 1960 L. KANNENGIESSER ET AL 2,928,220
HEAT SEALING
Filed July 18, 1958 3 Sheets-Sheet 1
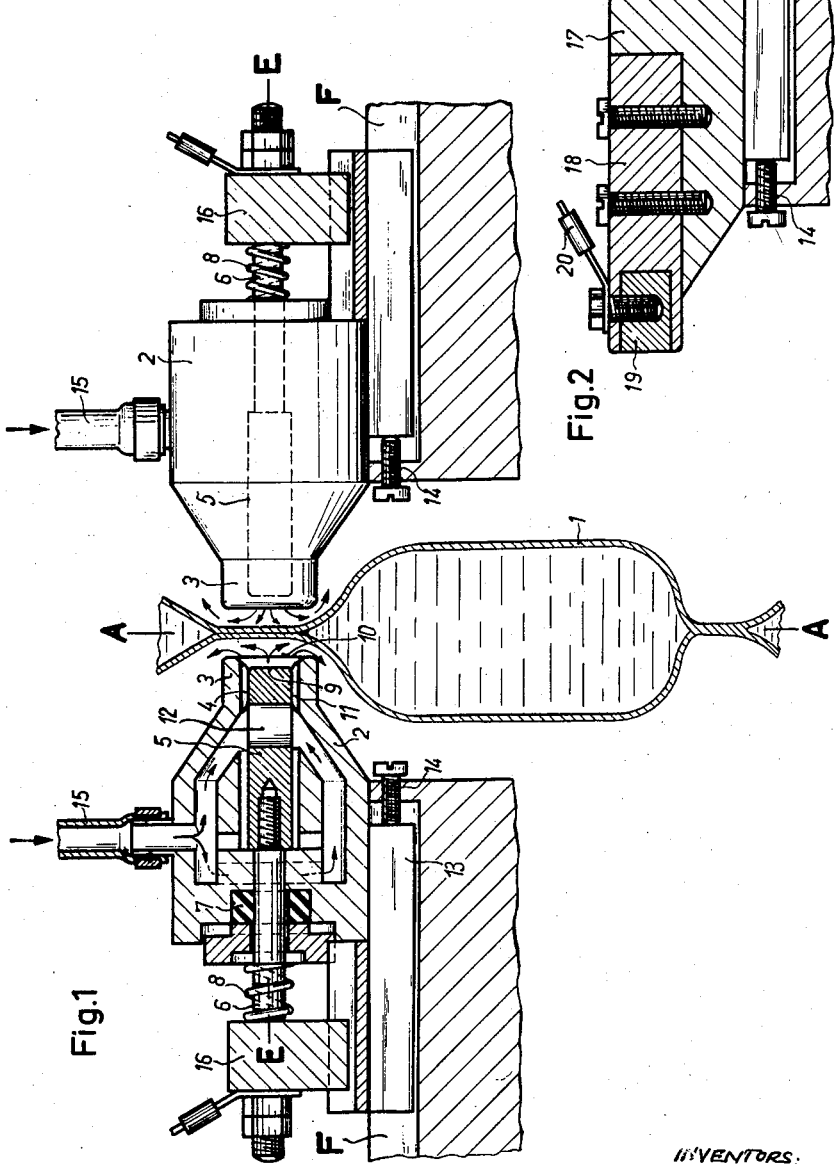
INVENTORS:
Ludwig Kannengiesser
and Helmut Lang,
By Ernest A. Marwick,
Their Attorney.

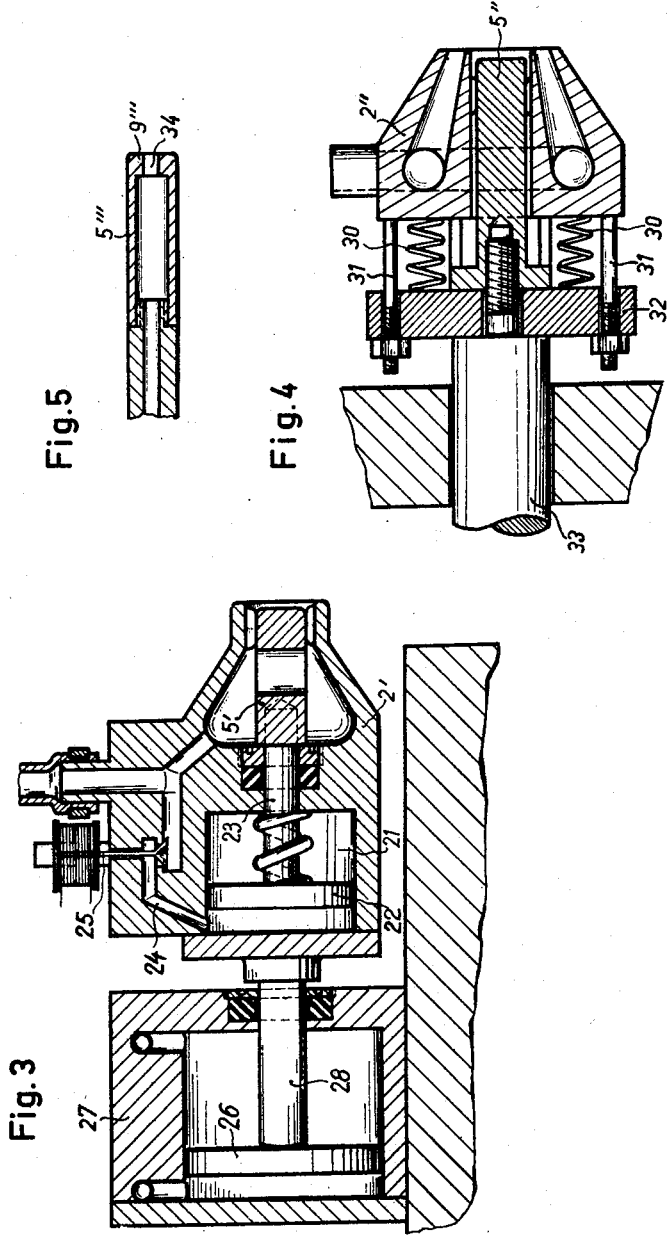

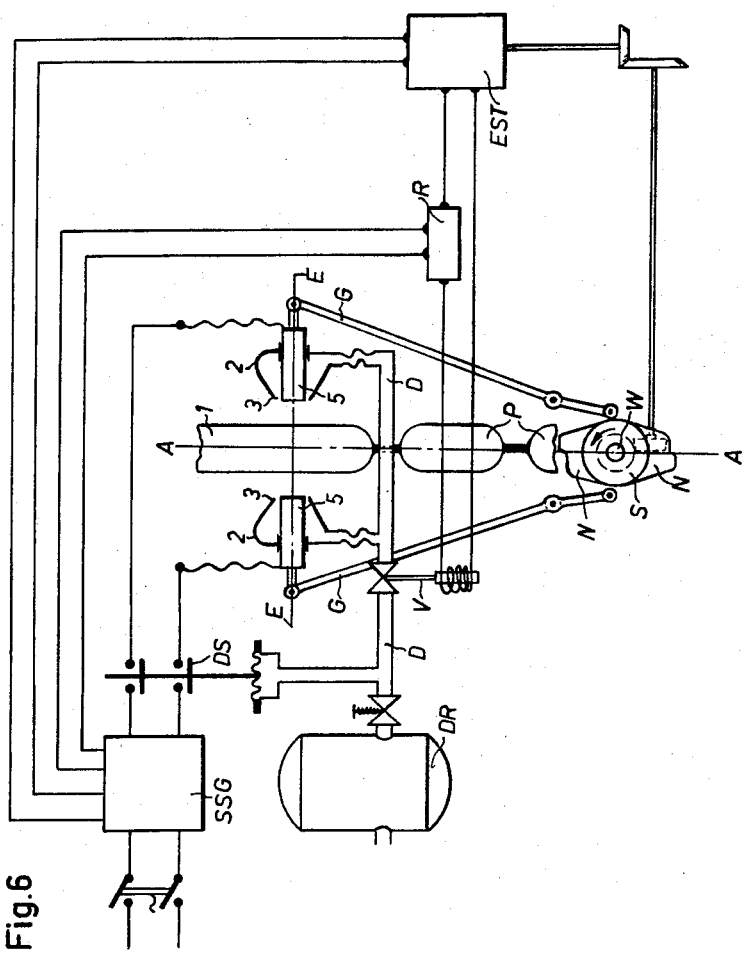

United States Patent Office 2,928,220
Patented Mar. 15, 1960

2,928,220

HEAT SEALING

Ludwig Kannengiesser, Munich, and Helmut Lang, Siegsdorf, Germany, assignors to Firma Rhenopack G.m.b.H., Worms-Speyerbenn, Germany Application July 18, 1958, Serial No. 749,514

Claims priority, application Germany July 25, 1957

10 Claims. (Cl. 53—180)

The invention relates to heat sealing, and relates more particularly to heat sealing of portions of a collapsible tube filled with a liquid or pasty material to produce separate though temporarily interlinked cushion type packages for the material. Still more particularly, the invention relates to methods and machines for flattening such portions of a collapsible tube filled with such material and having thermoplastic surface characteristics, and for heat sealing these flattened portions.

The purpose of the flattening is to squeeze all of the material out of the tube portion to be heat sealed, and subsequently to heat seal the walls of the flattened portion. This process is repeated until the entire tube has been formed into a string of cushion type packages interlinked by the flattened portions, the walls of which are heat sealed together and which at the same time separate the individual cushion type packages.

Lastly, the individual packages may be severed from each other by cutting midway through the flattened heat sealed portions.

Methods and machines are known to flatten and heat seal such portions, but the flattening is carried out by mechanical press action. This has several disadvantages. The squeezing out of the goods from the flattened portion by purely mechanical action was found to be usually incomplete; hence, the very first step in the process of the prior art gives rise to unreliable results. Furthermore, such machines usually are of complicated design, to produce the large pressures required. Lastly, as the machines of the prior art combined the press and heat sealing elements in one, and the heat sealing requires a certain amount of time of heat and pressure application and subsequent cooling, the operation of these machines was extremely time consuming. When the time was shortened for greater rapidity of operation with these machines, the quality of the seals became inferior.

It is accordingly among the principal objects of the invention to avoid the disadvantages of the prior art, and to provide methods and machinery which will reliably squeeze out the material from the flat portions of the tube and securely heat seal the flattened walls in comparably rapid operating time.

Broadly speaking, this is accomplished by compressed air jet action directed against the tube portions to flatten them, and by a heat sealing action under mechanical pressure directed against the flattened portion, and preferably a continuing application of the air jet action before and during the heat sealing. The prolonged application of the jet action has the advantage of cooling the heat sealed seam during the sealing action, to provide for a complete thermoplastic fusion.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

For a fuller understanding of the nature and objects of the invention reference should be had to the following detailed description, taken in connection with the accompanying drawings, in which:

Fig. 1 is a fragmentary elevational view, partly in longitudinal section, of a machine in accordance with an embodiment of the invention;

Fig. 2 is a fragmentary sectional view of a modification which shows a backing for use in connection with one of the housings and electrode of the embodiment of Fig. 1;

Fig. 3 is a fragmentary longitudinal sectional view of a modified housing and electrode;

Fig. 4 is a fragmentary sectional view of a further modified housing and electrode;

Fig. 5 is a fragmentary longitudinal sectional view of a still further modified electrode; and Fig. 6 is a schematic view of the entire machine including a wiring diagram.

In carrying the invention into effect in the embodiments which have been selected for illustration in the accompanying drawings and for description in this specification, and referring now particularly to Fig. 1, a collapsible tube 1 is shown that is made either of thermoplastic material, or of material that has at least thermoplastic surface characteristics. In the illustration of Figs. 1 and 6, the tube 1 is moved in the direction from the top towards the bottom of the view along a straight plane A—A (Fig. 6) which is disposed between the two operating members or housings 2 of the machine. Each member or housing 2 is movable (right and left in Fig. 1) in opposite directions along the plane E—E (Fig. 6) at right angle to the plane A—A towards and from the tube 1.

Each member 2 has on the front end, which is the end turned towards the tube 1, a nozzle 3 through which compressed air is discharged, as shown by the curved arrows in Fig. 1. On the interior of the nozzle 3 there are guiding means such as ribs 4 which guide a heat sealing metal electrode or plunger 5 for reciprocal movement centrally of the nozzle 3 in the housing 2. The external surface of the electrode 5 defines with the nozzle interior an annular passage 11 for the discharge of compressed air. The ribs 4 are disposed in the passage 11. Each electrode 5 is elongated and is movable relative to its housing 2 axially between an inactive position of retraction wherein its front face 9 (as shown in Fig. 1) is retracted behind the front surface 10 of the nozzle 3 and, respectively, an active position (not shown) wherein it projects beyond the nozzle 3 and makes contact with the exterior of the flattened portion of the tube 1. Means are provided, such as a metallic guide rod 6 and a metallic lug 16 connected thereto and movable therewith reciprocably, to push the electrode 5 into the active position of projection, and a gasket 7 is provided to prevent the rearward escape of compressed air from the interior of the housing 2. A retraction spring 8 urges the lug 16 and the rod 6 and the electrode 5 into the normal inactive position (Fig. 1).

A conduit for the compressed air which is formed internally of the housing 2, is branched near the point of air entrance from the intake pipe 15, and there is provided a connecting bore 12 for equalizing the conduit branches within each housing 2. A guide element 13 is in operative connection with each housing 2 and is abuttable against an adjustable set screw 14, to limit the forward movement of the housing 2 in the direction towards the tube 1.

Preferably, each housing 2 is composed of insulating material, so that it is unnecessary to provide for any special insulation for the electrode 5. Terminals are provided on the lug 16 for electric interconnection of the electrode 5, the rod 6 and the lug 16 to an electric source such as a generator SSG (Fig. 6) for instance of high frequency electric current.

The adjustment movement of the housings 2 and the electrodes 5 may be accomplished in various ways. It is possible, for instance, to move each housing 2 separately and independently of the other until its guide element 13 abuts against the set screw 14. The impact of the abutment will cause the lug 16 and the rod 6 and the electrode 5 to be propelled forwardly by inertia until the face 9 of the electrode 5 makes contact with the tube 1.

For each electrode 5 there may be provided one or more rods 6, and where a plurality of rods 6 are used for one electrode 5, the rods 6 are coupled together by means of the lug 16.

Instead of using two housings 2 of the embodiment of Fig. 1, it is possible to use instead only one housing and to substitute for the opposite housing a backing 17 of the type shown in Fig. 2. The backing 17 is slidable like the housing 2 towards and from abutment between a guide element and the set screw 14. The backing 17 comprises a bar 18 that carries a heat seal electrode 19 which is electrically connected to an electric terminal 20 for the completion of the electric heat seal circuit.

In the modification of Fig. 3, there is provided a housing 2' which defines on its interior a conduit for the compressed air to be discharged through an annular passage formed between the nozzle and the electrode 5'. The electrode 5' is driven by the piston 22 of an air cylinder 21. A connecting rod 23 connects the piston 22 with the electrode 5'. The air conduit includes a duct 24 which is controlled by an electrically operated magnetic valve 25, to control the admission of compressed air into the cylinder 21. When the valve 25 is opened, compressed air will enter into the cylinder 21 to the rear of the piston 22, in order to move the electrode 5' forwardly into the active position of projeciton (not shown) beyond the nozzle of the housing 2'. The housing 2' is movable itself by means of a piston 26 and piston rod 28 of an auxiliary air cylinder 27.

Another modification is illustrated in Fig. 4. The housing 2" defines on its interior a conduit for compressed air which terminates in an annular nozzle that is spaced throughout from the external surface of the electrode 5". The housing 2" carries rods 31 which are guided in a platen 32, and is urged away from the platen 32 by springs 30. The electrode 5" is secured to the platen 32, and the platen 32 is connected to a movable rod 33. The rods 31 carry nuts which are capable of adjustably positioning the maximum distance to which the housing 2" may be moved from the platen 32.

In the modification of Fig. 5, the electrode 5''' is hollow and defines on its interior a duct for the compressed air, and has in its front face 9''' openings 34 for the discharge of the compressed air towards the tube 1. Preferably, the compressed air emerging through the openings 34 should have a higher pressure than the compressed air that emanates from the nozzle of the housing. It is possible to utilize the modified electrode 5''' either within a housing 2 of Fig. 1, or 2' of Fig. 3, or 2" of Fig. 4, or to utilize it alone without any air discharging housing; where the air is discharged only by the electrode 5''', the compressed air should compress and flatten the tube portion before there occurs physical impact between the plunger and the tube.

The operation of the above described embodiments of the instant invention is as follows, reference being had particularly to the schematic illustration in Fig. 6:

The tube 1 is moved in the direction A—A, the finished packages being shown below the remainder of the tube 1. The feeding of the tube takes place by means of any suitable conventional feeding mechanism, and the distance between successive flattened portions of the tube 1 is selectively adjustably predetermined, depending upon the nature and volume of the contents of individual packages designed. The path of the tube 1 carries it between the two opposite parts of the machine, for instance the two housings 2 of Fig. 1.

On each side of the tube 1 there is one part of the machine which generally is composed of two elements, namely a housing 2 for directing a jet or stream of compressed air towards the tube 1, and an electrode 5 to heat seal the wall of the flattened portion. At such a portion there is first applied the compressed air in the direction E—E at right angle to the direction A—A of movement of the tube 1 until the portion has been emptied of material inside, and then the electrodes 5 are applied from opposite sides, again at right angle to the direction A—A, and an electric energizing current is sent through the electrodes for heat sealing.

The compressed air is preferably applied before, during and for a while after the application of the heat sealing electrodes, to assure sufficient cooling of the seam to promote good thermoplastic fusion.

As explained in the foregoing detailed description, a single housing and a single electrode may be applied with a backing 17 (Fig. 2); in the following, however, for the sake of simplification and by way of exemplification only, and not in any limiting sense, the operation of the machine is explained in connection with two housings 2 and two electrodes 5 juxtaposed and operating in opposite relationship.

Furthermore, it is also possible, in accordance with a modification of the instant method, to bring the nozzles 3 of the housings 2 first into physical contact with the tube 1 for an initial flattening action. Since the nozzles 3 are hollow on the interior, however, the squeezing out of the material at the tube portion will not be complete, as there is no pressure exerted internally of the endless edge of the nozzles 3. There will then follow an air jet or air stream application through the nozzles 3 to complete the squeezing out. It is thus possible either to accomplish the flattening by compressed air action alone, or by a combined physical squeezing action by the nozzles 3 and compressed air expelled through the interior of the nozzles.

When a new portion is to be flattened, the housings 2 will be moved towards the tube 1, for instance by means of a linkage system G which is operated from a double cam N that is keyed to a revolving shaft W. At the time of, or slightly before, the commencement of the movement of the electrodes 5, a valve V of the compressed air line D will be opened, so that jets of compressed air will emerge from the nozzles 3 of the housings 2, which will compress and flatten the portion of the tube 1 between them.

The valve V is preferably a magnetic valve which is controlled from a control element EST, the mechanical part of which is energized by means of a gear transmission from the shaft W.

The compressed air line D includes a diaphragm-operated electric switch DS that closes the electric energizing circuit for the heat sealing electrodes 5, connecting them with the high frequency current generator SSD.

The switch DS will operate only if there is sufficient air pressure in the line D. This is a safety feature which provides that if the air pressure is below a certain value as determined by the calibration of the diaphragm of the switch DS, there will be no subsequent heat sealing.

After the portion of the tube 1 has been flattened to squeeze out all of the material, the electrodes 5 will be fed towards the flattened portion. After the electrodes 5 have made contact with the flattened portion, the generating current will be applied by means of the control mechanism EST, to heat seal the flattened walls of the portion.

The circuit for the magnetic valve V preferably includes a delayed action relay R to close the valve V independently of the sealing current, after the electrodes 5 have been retracted, so that compressed air will still emerge from the nozzles 3 in order to cool the previously fused sealing seam.

The line D for the compressed air is connected to a compressed air tank DR which in turn is fed by an air pump (not shown) and in which a predetermined pressure is maintained.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a machine, for use in flattening and heat sealing a portion of a flexible tube filled with liquid or pasty material and having a wall with thermoplastic surface characteristics, in combination, two opposite members including means interconnected to an electric source and operable to heat seal the wall of said tube portion therebetween, at least one of said members defining on its interior a conduit for compressed air and being actuatable to direct a jet of compressed air towards said portion for flattening it squeezing material out of said portion, said heat sealing means comprising an electrode disposed in each member and movable therein to and from an active position of contact with said tube portion, said conduit including a passage surrounding said electrode disposed in said one member, whereby said jet may be discharged from said one member before and during the heat sealing application.

2. In a machine, as claimed in claim 1, together with, means for retracting said electrode of said one member to an inactive position wherein the front face of said electrode is spaced behind the front surface of said one member.

3. In a machine, as claimed in claim 1, together with, guiding means between said one member and said electrode disposed on the interior of said one member defining said passage forming part of said conduit for the compressed air.

4. In a machine, for use in flattening and heat sealing a portion of a flexible tube filled with liquid or pasty material and having a wall with thermoplastic surface characteristics, in combination, two opposite members both movable to and from a position of predetermined close proximity adjacent said portion, at least one of said members defining on its interior a conduit for compressed air and having a nozzle defining a passage forming part of said conduit and being operable to direct a jet of compressed air towards said portion for flattening it for squeezing all material out of said portion, and means connected to said members and fed from an electric source and operable to heat seal the wall of said portion when flattened by said compressed air.

5. In a machine, as claimed in claim 4, said heat sealing means comprising an elongated electrode disposed in said one member and movable therein between an inactive position of retraction within said passage and, respectively, an active position projecting beyond the nozzle of said one member and adapted to make contact with said portion for heat sealing the wall thereof.

6. In a machine, as claimed in claim 5, together with, a retraction spring connected to said electrode and operable to retract it into said inactive position.

7. In a machine, as claimed in claim 5, said electrode being hollow and defining on its interior a duct for the compressed air and having at least one frontal opening intercommunicating with said duct for the discharge of the compressed air.

8. In a machine, as claimed in claim 5, together with, means connected to said electrode and operable to propel said electrode from the inactive towards the active position.

9. In a machine, as claimed in claim 8, said propelling means including an air cylinder connected to said one member and a piston movable in the cylinder and connected to the electrode thereof.

10. In a machine, for use in flattening and heat sealing a portion of a flexible tube filled with liquid or pasty material and having a wall with thermoplastic surface characteristics, in combination, two opposite members each defining on its interior a conduit for compressed air and having a nozzle defining a passage forming part of said conduit and being operable to direct a jet of compressed air towards said portion for flattening it for squeezing all material out of said portion, and means connected to said members and fed from an electric source and operable to heat seal the wall of said portion when flattened by said compressed air, said heat sealing means comprising an elongated electrode disposed in each member and movable therein between an inactive position of retraction within said passage and, respectively, an active position projecting beyond the nozzle of said member and making contact with said portion for heat sealing the wall thereof.

References Cited in the file of this patent

UNITED STATES PATENTS

| 2,340,260 | Clunan | Jan. 25, 1944 |
| 2,486,759 | Pfeiffer | Nov. 1, 1949 |
| 2,530,400 | Rado | Nov. 21, 1950 |
| 2,624,992 | Salfisberg | Jan. 13, 1953 |
| 2,747,346 | Tigerman | May 29, 1956 |